United States Patent [19]
Phoy et al.

[11] Patent Number: 5,493,191
[45] Date of Patent: Feb. 20, 1996

[54] B-TYPE ACTUATOR WITH TIME OUT

[75] Inventors: Chamroeun P. Phoy, Glendale Heights; William A. Andrews, West Chicago, both of Ill.

[73] Assignee: Eaton Corporation, Cleveland, Ohio

[21] Appl. No.: 308,724

[22] Filed: Sep. 19, 1994

[51] Int. Cl.⁶ .................................................. H02P 1/04
[52] U.S. Cl. .......................... 318/466; 318/443; 318/444
[58] Field of Search .................................. 318/138, 254, 318/257–289, 560–646, 440–469

[56] References Cited

U.S. PATENT DOCUMENTS

| | | | |
|---|---|---|---|
| 4,591,773 | 5/1986 | Numata | 318/663 |
| 4,611,154 | 9/1986 | Lambropoulos et al. | 318/490 |
| 4,663,575 | 5/1987 | Juzswik et al. | 318/444 |
| 4,686,438 | 8/1987 | Ohe et al. | 318/280 |
| 4,705,997 | 11/1987 | Juzswik | 318/293 X |
| 4,765,426 | 8/1988 | Shimizu | 180/79.1 |
| 5,034,674 | 7/1991 | Sato | 318/696 |
| 5,084,658 | 1/1992 | Nielsen et al. | 318/139 |
| 5,369,342 | 11/1994 | Rudzewicz et al. | 318/102 |

*Primary Examiner*—Paul Ip
*Attorney, Agent, or Firm*—Jennifer M. Stec; Roger A. Johnston

[57] ABSTRACT

An improved actuator (10) wherein movement of an external potentiometer ($R_x$) to drive a bi-directional motor (50) and move an attached member starts a timer (68). When a predetermined time period has elapsed, the actuator cuts power to the drivers (U1) of the motor, thereby putting the system into a "sleep" mode in which a minimum amount of current is drawn. If the external potentiometer was moved so as to cause an end of travel position of the member and the motor stalls, the actuator maintains this stall condition only until expiration of the predefined time period at which time the sleep mode is initiated. This sleep mode is thereafter maintained until power is reset or until the position of the external control potentiometer is changed. The time-out period is set to allow for full movement of the vane as well as to compensate for any uncertainty as to whether an end of travel position has been reached.

15 Claims, 2 Drawing Sheets

5,493,191

B-TYPE ACTUATOR WITH TIME OUT

BACKGROUND AND SUMMARY OF THE INVENTION

This invention relates generally to electronic actuator circuits and, more particularly, to an actuator for controlling an output based upon the position of an externally controlled potentiometer, wherein the actuator includes an internal feedback potentiometer matched in position to the external potentiometer.

Actuators of this type, sometimes referred to as B-type actuators, are often used in vehicle HVAC (heating, ventilation and air conditioning) systems to control the rotational position of the output shaft of a bi-directional electric motor. This output shaft, in turn, can be used to control the position of a butterfly vane member to regulate the blend of heated and cooled air blown into the passenger compartment of the vehicle by moving the vane to alternately open and close warm and cool air ducts.

The actuator is usually controlled by an external potentiometer operable by the passenger via a rotary or linearly slidable switch. The passenger controlled potentiometer converts positional information of the switch into an electrical resistance used as an input to the actuator circuit. This switch is typically movable between a COOL setting, wherein a warm air duct is completely closed off and a cool air duct is fully opened, and a WARM setting, wherein a cool air duct is completely closed off and a warm air duct is fully opened, or to any position therebetween wherein the vane assumes an intermediate position and both ducts are left partially open.

Movement of the switch to cause the vane to move to either fully closed position eventually results in a physical end of travel position of the vane. The duct itself will typically disable any further movement of the vane, and therefore further rotational movement of the motor output shaft, thereby causing the motor to stall. Currently available actuators of this type, as used in such vehicular HVAC systems, stall at each end of travel position, and thereafter maintain a continuous stall condition until reset, or until further movement of the passenger controlled potentiometer occurs. However, this continuous stall mode is inherently disadvantageous since the motor in this state draws an undesirably high amount of electrical current.

Prediction of the end of travel positions of the vane, in order to anticipate arrival of the vane at those positions and provide an actuator design which prevents such a continuous stall condition, can be difficult since the end of travel positions vary from vehicle to vehicle. This is due both to differences in duct designs between vehicle types and to wide tolerances in non-critical parts such as air ducts. End of travel positions would need to be predicted for each vehicle and overly conservative predictions would lead to the elimination of fully open or closed positions and therefore a less efficient HVAC system.

The present invention provides an improvement over previous actuators of this type in that movement of the external potentiometer to drive the motor and move the vane starts a timer. When a predetermined time period has elapsed, the actuator cuts power to the drivers of the motor, thereby putting the system into a "sleep" mode in which a minimum amount of current is drawn. If the external potentiometer was moved so as to cause an end of travel position of the vane and the motor stalls, the actuator maintains this stall condition only until expiration of the predefined time period after which the sleep mode is initiated. This sleep mode is thereafter maintained until power is reset or until the position of the external control potentiometer is changed. The time-out period is set to allow for full movement of the vane as well as to compensate for any uncertainty as to whether an end of travel position has been reached. This eliminates the need to predict the end of travel position in order to avoid a continuous stall condition.

The present actuator thus provides significant improvements over previous actuators of this type and may be used in a wide variety of vehicles. The actuator and motor when in sleep mode consume very little current, less than when in a continuous stall condition and even less than when in a quiescent state. The actuator circuit itself is simple, inexpensive and suitable for a wide variety of applications. These and other advantages and features of the present invention will become apparent from the following description taken in conjunction with the accompanying drawings.

DETAILED DESCRIPTION OF THE PREFERRED EMBODIMENT

Figure 1:
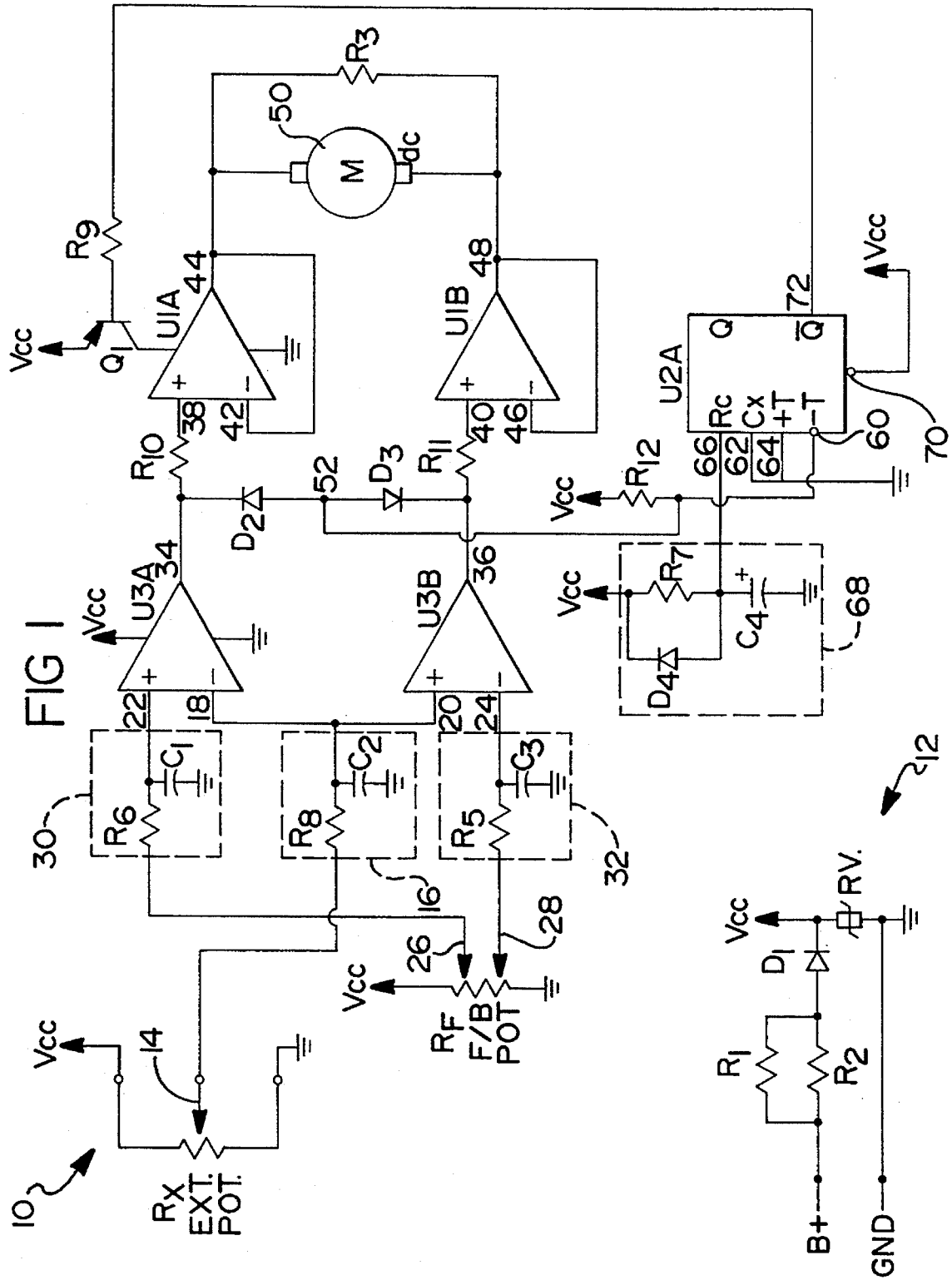
FIG. 1 is a schematic diagram of the actuator circuit of the present invention with a dual center tapped internal feedback potentiometer.

Turning now to the drawings, and in particular to FIG. 1, a schematic diagram of the actuator circuit of the present invention is indicated generally at 10. While actuator 10 and the operation thereof will hereinafter be described with respect to the vehicle HVAC application discussed above, it should be readily apparent that this actuator is equally well suited to a wide variety of other applications.

A power supply 12, comprising resistors $R_1$ and $R_2$, diode $D_1$ and voltage suppressor $RV_1$, provide a voltage of $V_{cc}$ to actuator circuit 10, preferably from the vehicle's on-board battery B+. This voltage $V_{cc}$ is applied to actuator circuit 10 across an externally controlled potentiometer $R_x$ to a wiper 14. Potentiometer $R_x$ is operably coupled to a control knob or selector (not shown) which is movable, such as by a passenger of the vehicle to control the blend of heated and cooled air which is blown into the passenger compartment. Alternately, however, any other suitable device for providing a controllably variable voltage indicative of a desired position of the movable butterfly vane may be used in place of the combination of voltage supply $V_{cc}$ and potentiometer $R_x$.

Wiper 14 is electrically coupled to a low pass filter 16 which includes resistor $R_8$ and capacitor $C_2$. The output of filter 16 is fed to inputs 18 and 20 of voltage comparators U3A and U3B, respectively. Inputs 22 and 24 of comparators U3A and U3B are provided by wipers 26 and 28 of an internal feedback potentiometer $R_F$, in this preferred embodiment, a double tapped screened on potentiometer. Potentiometer $R_F$ provides electrical feedback, via wipers 26 and 28, indicative of the actual position of the vane member. However, appropriate feedback signals may alternately be provided with any other suitable feedback means. Signals from wiper 26 pass through a low pass filter 30, having resistor R6 and capacitor C1, and those from wiper 28 pass through $R_5$ and $C_3$ of a low pass filter 32.

Outputs 34 and 36 of comparators U3A and U3B pass respectively through series resistors $R_{10}$ and $R_{11}$, and into inputs 38 and 40 of drivers U1A and U1B. Input 42 of driver U1A is tied to output 44 so that the output of U1A follows that of U3A. In a like fashion, input 46 of U1B is tied to output 48. Driver outputs 44 and 48 are connected across the terminals of a bi-directional dc motor 50, this connection made in parallel with a resistor $R_3$. Motor 50 includes an output means such as a rotatable shaft used to control the position of the butterfly vane member (not shown) of the present application, or alternately any member whose position is to be controlled in accordance with an input variable voltage signal such as that applied via $V_{cc}$ and $R_x$.

Voltage $V_{cc}$, through a resistor $R_{12}$, is applied at node 52 to inputs 38 and 40 of comparators U3A and U3B, via oppositely biased diodes $D_2$ and $D_3$, and resistors $R_{10}$ and $R_{11}$. This voltage is also applied to an active low terminal 60 of a monostable multivibrator U2A, such as that bearing manufacturers designation MC14538B, commonly commercially available from Motorola. Terminals 62 and 64 of multivibrator U2A are grounded and terminal 66 is electrically coupled to a timing circuit 68. Timer 68 includes diode $D_4$ and resistor $R_7$ connected in parallel between $V_{cc}$ and ground, the connection to ground being made through a capacitor $C_4$. Monostable multi-vibrator U2A is also coupled directly to $V_{cc}$ at terminal 70 and has an output at 72. Output 72 is connected to the base of a PNP transistor $Q_1$, this connection made through a resistor $R_9$. The emitter of $Q_1$ is electrically coupled to $V_{cc}$ and the collector to driver U1.

With the individual components of actuator circuit 10 having thus been set forth, the operation of this circuit can now be described in detail. When external feedback potentiometer $R_x$ is positioned with respect to wiper 14 as shown in FIG. 1, the voltage at wiper 14 is, for example, about one half of $V_{cc}$. Correspondingly, the voltage at wiper 26 of feedback potentiometer $R_F$ is something more than half of $V_{cc}$ and the voltage at wiper 28 somewhat less. Thus, the voltage applied to input 22 of comparator U3A is higher than that applied to input 18 thereby driving output 34 of comparator U3A high. The voltage applied to input 20 of U3B is higher than that applied to input 24, driving output 36 of comparator U3B high. With both outputs 34 and 36 in a high state and drivers U1A and U1B not powered, the actuator circuit thus is in a "sleep" mode, awaiting the next movement of potentiometer $R_x$ or a reset condition.

However, when the external potentiometer $R_x$ is moved upwardly with respect to FIG. 1, typically to draw warmer air into the passenger compartment of the vehicle, the signal at input 18 of comparator U3A (from wiper 14) becomes higher than that at wiper 26, and therefore higher than that at input 22, pulling output 34 of U3A low. This high to low transition triggers active low input 60 of monostable multivibrator U2A, set up as a precision retriggerable/resettable monostable multivibrator to detect a positive or negative edge or change in state, to ground terminal 66 and start timer 68. At this point in time output 72 goes low thus turning ON transistor $Q_1$ and thereby powering U1A and U1B to drive motor 50 and put the actuator circuit into a "run" mode. In this exemplary embodiment, motor 50 thus moves the butterfly vane in a direction to open the warm air duct and close the cool air duct.

If the desired position of the vane is achieved prior to expiration of the time out period set by circuit 68, as indicated by the signals to wipers 26 and 28 of feedback potentiometer $R_F$, then output 34 returns to a high state. With outputs 34 and 36 both high and driver U1 powered, the actuator is in a "quiescent" mode which consumes more current than the sleep mode due to power consumption by driver U1. When timer 68 eventually times out, U2A will shut off $Q_1$. Transistor $Q_1$ in turn will shut off U1, interrupting the control signal to motor 50 and putting the actuator and motor back into the preferred sleep mode.

If, however, external potentiometer $R_x$ has been moved to a position which requires the vane to be moved to an end of travel position wherein the cool air duct is to be fully closed, motor 50 may run until the end of travel position is achieved and then stall. The time out period of timer 68 is preferably set to a duration long enough to allow time for an end of travel position to be reached and a stall mode to be entered. However, this stall mode, wherein motor 50 continues to be driven by U1 but the output shaft and vane no longer have freedom to move, continues only until timer 68 times out. As described above, at the expiration of the time out period, U2 shuts $Q_1$ off thus shutting off power to driver U1. By powering U1 through $Q_1$, transistor $Q_1$ acts as a switch enabling and disabling driver U1 to control motor 50 as well as current consumption.

Actuator 10 is configured such that multivibrator U2A similarly detects a negative transition in the output of comparator U3B, caused by a movement of potentiometer Rx in an opposite direction, such as to provide cooler air to the passenger compartment. The circuit 10 operates in an analogous fashion to drive motor 50 in a reverse direction. Multivibrator U2A detects a high to low transition from either external potentiometer direction and in response thereto starts timer 68 and sends control signals to motor 50. U1A and U1B are thus set up as buffers powered through $Q_1$ to follow U3A and U3B to drive motor 50 in opposing directions.

Thus the present actuator provides four modes of operation: run, quiescent, stall and an additional sleep mode. This sleep mode consumes the least amount of current while the only temporary stall mode consumes the most current. This improved actuator is useful in a variety of applications and provides significant advantages over actuators of this type heretofore available. Choosing appropriate values for the individual electronic components of the actuator control the time out period and overall operation of the actuator.

Figure 2:
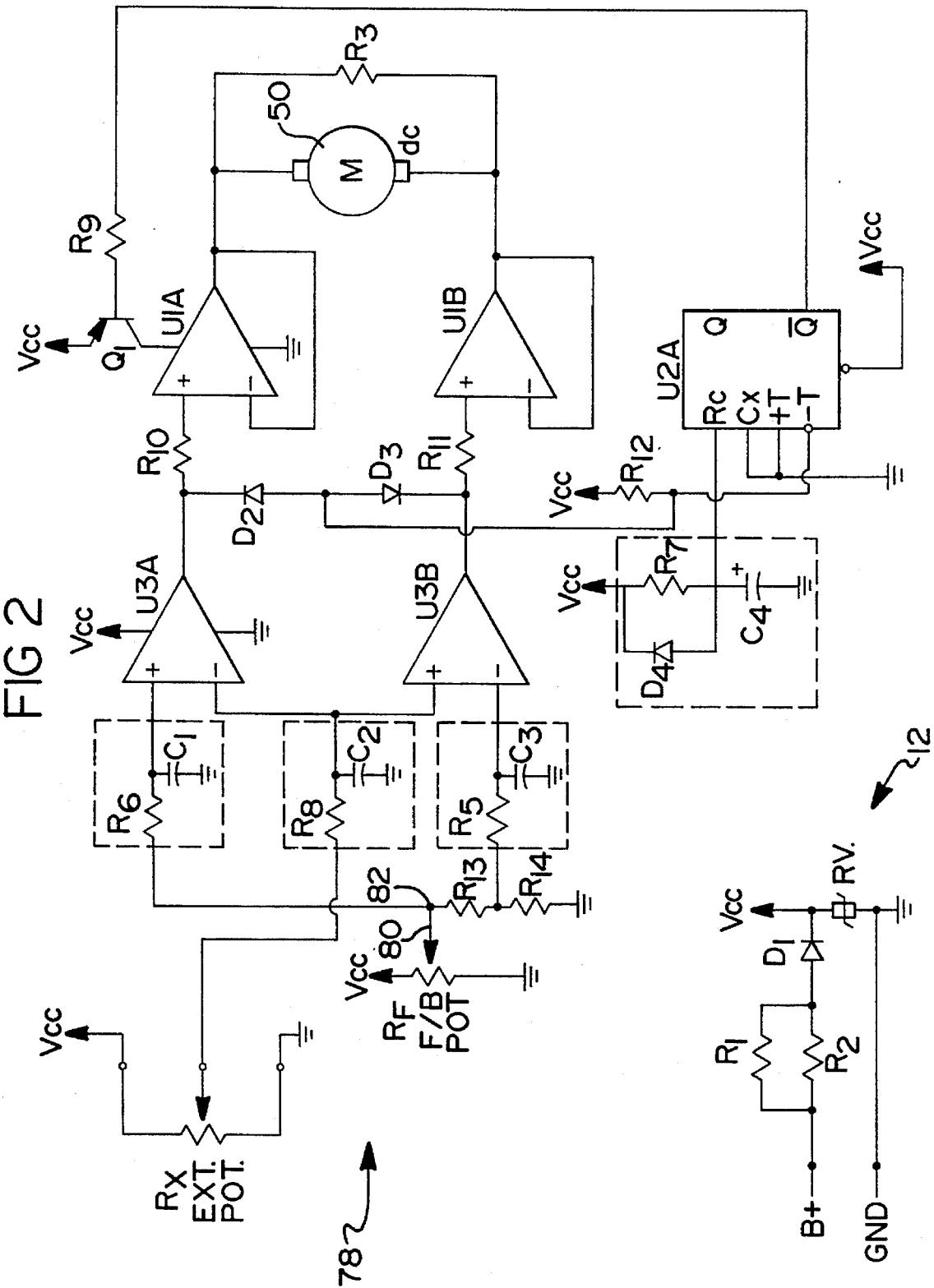
FIG. 2 is a schematic diagram similar to FIG. 1 illustrating an alternate embodiment of the invention in which the dual tapped internal feedback potentiometer is replaced with a single tapped potentiometer.

FIG. 2 illustrates an alternate embodiment of the present invention in which actuator 78 includes a singe tapped feedback potentiometer in place of the dual tapped device. Operation of the circuit is essentially the same as described in conjunction with FIG. 1 with the exception that wipers 26 and 28 of dual tapped feedback potentiometer $R_F$ are replaced with a single wiper 80. In addition, Resistors $R_{13}$ and $R_{14}$ are further included with $R_{13}$ being connected between wiper 80 an $R_5$ and resistor $R_{14}$ connected between node 82 (between $R_{13}$ and $R_5$) and ground.

However, the dual tapped feedback potentiometer has several advantages over the single tapped. For instance with actuator 78, the dead band, within which the a quiescent or sleep mode is achieved, varies with the feedback potentiometer position. This dead band is wider when the wiper position is closer to $V_{cc}$ and narrower when the wiper position is closer to ground. While the single tapped potentiometer embodiment also works well, the double tapped device results in a fixed dead band as well as constant hysteresis at all positions.

For the sake of clarity values for the various devices used in the exemplary embodiment described herein have been omitted from FIGS. 1 and 2 but for completeness are provided herebelow:

| Resistors | Capacitors | Other devices |
| --- | --- | --- |
| $R_1$ 27 Ω | $C_1$ 0.1 μF | $D_1$ 1N4004 |
| $R_2$ 27 Ω | $C_2$ 0.1 μF | $D_2$ 1N4148 |
| $R_3$ 560 Ω(1 W) | $C_3$ 0.1 μF | $D_3$ 1N4148 |
|  | $C_4$ 100 μF | $D_4$ 1N4148 |
| $R_5$ 10 k |  | $RV_1$ MOV |
| $R_6$ 10 k |  | U1A L2722 |
| $R_7$ 200 k |  | U1B L2722 |
| $R_8$ 10 k |  | U2A MC14538B |
| $R_9$ 10 k |  | U3A LM2904 |
| $R_{10}$ 10 k |  | U3B LM2904 |
| $R_{11}$ 10 k |  | $Q_1$ MPSA56 |
| $R_{12}$ 10 k |  |  |
| $R_{13}$ 2 k |  |  |
| $R_{14}$ 100 k |  |  |

The foregoing discussion discloses and describes an exemplary embodiment of the present invention. One skilled in the art will readily recognize from such discussion, and from the accompanying drawings and appended claims, that certain changes, modifications and variations can be made therein without departing from the spirit and scope of the invention as defined by the following claims.

What is claimed is:

1. An actuator circuit for driving an electric motor to control the position of an output shaft of the motor in response to a signal from an external device indicative of a desired position of the output shaft, said actuator comprising:

a power supply;

a circuit for detecting a difference between a desired position of the output shaft and the actual position of the output shaft;

a motor driving circuit electrically coupled to said detecting circuit and to said electric motor;

a timer circuit electrically coupled to said detecting circuit and to said driving circuit; and switch means connected between said power supply and said driving circuit, said switch responsive to said detection circuit to facilitate the supply of power to said driving circuit, said switch responsive to said timer circuit for interrupting the supply of power to said driving circuit.

2. The actuator of claim 1 wherein said circuit for detecting includes feedback signal generation means for generating a signal indicative of the actual position of said output shaft.

3. The actuator of claim 2 wherein said feedback generation means includes a dual tapped feedback potentiometer.

4. The actuator of claim 1 wherein said external device includes a potentiometer wherein the position of the potentiometer is directly related to the desired position of the motor output shaft.

5. The actuator of claim 1 wherein said motor is bi-directional and said actuator is adapted to drive said motor in two opposing directions.

6. The actuator of claim 5 wherein said actuator controls the rotational position of said output shaft.

7. The actuator of claim 1 wherein said actuator operates between four modes:

a RUN mode wherein said driving circuit is powered and driving said motor;

a STALL mode wherein said driving circuit is powered and driving said motor but said output shaft of said motor is physically prohibited from moving;

a QUIESCENT mode wherein said driving circuit is powered but is not driving said motor; and a SLEEP mode wherein said driving circuit is not powered.

8. The actuator of claim 1 wherein said motor output shaft has a vane member coupled thereto and said actuator is used in a vehicle HVAC system to control the position of said vane in order to control the temperature of air provided to the passenger compartment of said vehicle.

9. The actuator of claim 1 wherein said switch includes at least one active device.

10. A method of controlling the position of the output shaft of a bi-directional electric motor in response to a signal from an externally controlled device comprising the steps of:

detecting a difference between a desired position of said output shaft and the actual position of said shaft;

upon such detection starting a timer, providing electrical power to a driving circuit and driving said motor;

ceasing to drive said motor when said actual position of said shaft is substantially at said indicated desired position; and upon the expiration of a predefined time period, cutting off the supply of electrical power to said driver.

11. The method of claim 10 further comprising the step of providing a feedback signal indicative of the actual rotational position of said output shaft, wherein said feedback signal is used for detecting said difference.

12. The method of claim 10 wherein said motor output shaft has a vane member coupled thereto and said actuator is used in a vehicle HVAC system to control the position of said vane in order to control the temperature of air provided to the passenger compartment of said vehicle.

13. An actuator circuit for driving a bi-directional electric motor to control the rotational position of an output shaft of said motor in response to a signal from a potentiometer indicative of the desired position of said output shaft, said shaft being rotatable to a plurality of positions between a pair of opposing end of travel positions, said actuator circuit comprising:

a power supply;

a circuit for detecting a difference between a desired position of said output shaft and the actual position of said shaft, said circuit for detecting including a feedback signal generation means for generating a signal indicative of the actual position of said output shaft;

a motor driving circuit electrically coupled to said detecting circuit and to said electric motor;

a timer circuit electrically coupled to said detecting circuit and to said driving circuit;

switch means electrically coupled to said power supply and said driving circuit, said switch means responsive to said detection circuit to facilitate the supply of power to said driving circuit, said switch responsive to said timer circuit for interrupting the supply of power to said driving circuit when one of said end of travel positions has been reached and a predetermined time period expires.

14. The actuator of claim 13 wherein said actuator operates between four modes:

a RUN mode wherein said driving circuit is powered and driving said motor;

a STALL mode wherein said driving circuit is powered and driving said motor but said output shaft of said motor is at one said end of travel position and is physically prohibited from moving;

a QUIESCENT mode wherein said driving circuit is powered but is not driving said motor; and a SLEEP mode wherein one said end of travel position has been reached and said driving Circuit is not powered.

15. The actuator of claim 13 wherein said motor output shaft has a vane member coupled thereto and said actuator is used in a vehicle HVAC system to control the position of said vane in order to control the temperature of air provided to the passenger compartment of said vehicle.

* * * * *